(12) United States Patent
Killat et al.

(10) Patent No.: US 8,470,120 B2
(45) Date of Patent: Jun. 25, 2013

(54) SILANE-MODIFIED DISPERSION POWDERS

(75) Inventors: Marion Killat, Burghausen (DE); Stefan Killat, Burghausen (DE)

(73) Assignee: Wacker Chemie AG, Munich (DE)

( * ) Notice: Subject to any disclaimer, the term of this patent is extended or adjusted under 35 U.S.C. 154(b) by 715 days.

(21) Appl. No.: 12/091,145

(22) PCT Filed: Oct. 13, 2006

(86) PCT No.: PCT/EP2006/067366
§ 371 (c)(1),
(2), (4) Date: Apr. 22, 2008

(87) PCT Pub. No.: WO2007/048714
PCT Pub. Date: May 3, 2007

(65) Prior Publication Data
US 2008/0271848 A1 Nov. 6, 2008

(30) Foreign Application Priority Data
Oct. 27, 2005 (DE) .......................... 10 2005 051 588

(51) Int. Cl.
| | | |
|---|---|---|
| C04B 37/00 | (2006.01) | |
| B32B 27/00 | (2006.01) | |
| B60C 1/00 | (2006.01) | |
| C08K 5/24 | (2006.01) | |
| C08K 5/54 | (2006.01) | |
| H01B 3/44 | (2006.01) | |

(52) U.S. Cl.
USPC .......... 156/325; 156/332; 524/262; 524/263; 524/264; 524/265

(58) Field of Classification Search
USPC .......................... 156/325, 332; 524/262–265
See application file for complete search history.

(56) References Cited

U.S. PATENT DOCUMENTS

| | | | |
|---|---|---|---|
| 5,681,892 A | | 10/1997 | Weidner et al. |
| 6,020,403 A | * | 2/2000 | Eck et al. ....................... 523/340 |
| 6,090,868 A | * | 7/2000 | Eck et al. ....................... 523/212 |
| 6,184,274 B1 | * | 2/2001 | Herold et al. ................. 524/114 |
| 6,191,235 B1 | | 2/2001 | Eck |
| 6,429,239 B1 | | 8/2002 | Eck |
| 2001/0034391 A1 | * | 10/2001 | Eck et al. ....................... 524/188 |
| 2002/0007009 A1 | * | 1/2002 | Stark et al. .................... 524/806 |

FOREIGN PATENT DOCUMENTS

| | | |
|---|---|---|
| DE | 2148456 | 4/1973 |
| DE | 4402408 A1 | 8/1995 |
| DE | 4402409 A1 | 8/1995 |
| DE | 10040407 A1 | 2/2002 |
| EP | 0035332 A2 | 9/1981 |
| EP | 0214696 A1 | 3/1987 |
| EP | 0215518 A1 | 3/1987 |
| EP | 0292155 A2 | 11/1988 |
| EP | 0401496 A | 12/1990 |
| EP | 0640630 B1 | 8/1998 |
| EP | 1134255 B1 | 1/2003 |
| EP | 1153979 B1 | 6/2003 |
| EP | 0857772 B1 | 9/2004 |
| JP | 05-000836 A | 1/1993 |
| JP | 9-25434 A | 1/1997 |
| JP | 10-182841 A | 7/1998 |
| WO | 9520627 A1 | 8/1995 |

OTHER PUBLICATIONS

English Patbase Abstract corresponding to DE4402408.
English Patbase Abstract corresponding to DE4402409.
English Patbase Abstract corresponding to DE1040407.
English Patbase Abstract corresponding to DE2148456.
Fox T.G., Bull. Am. Physics Soc. 1,3, p. 123 (1956).
The Polymer Handboook, 2nd Ed., J. Wiley & Sons, New York (1975).
DIN 18156.
EN 1348:1997.
Perinorm.com print including the replacement of BS 5980 by EN 12004:2004:2001.
EN 12004:2001.

* cited by examiner

Primary Examiner — Michael Orlando
(74) Attorney, Agent, or Firm — Brooks Kushman P.C.

(57) ABSTRACT

Water-redispersible polymer powder compositions are obtained by means of free-radical-initiated polymerization in aqueous medium of one or more monomers of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides and subsequent drying of the polymer dispersion, wherein one or more silanes of the general formula $(RO)_{3-n}R^1{}_n SiR^2 X$ (1) where X is an amino- or epoxy-containing radical are added before drying of the polymer dispersion. The powders are especially useful in tile adhesives for tiles having low water absorbtion capacity.

22 Claims, No Drawings

SILANE-MODIFIED DISPERSION POWDERS

CROSS-REFERENCE TO RELATED APPLICATION

This application is the U.S. national phase of PCT Appln. No. PCT/EP2006/067366 filed Oct. 13, 2006 which claims priority to German application DE 10 2005 051 588.6 filed Oct. 27, 2005.

BACKGROUND OF THE INVENTION

1. Field of the Invention

The invention relates to silane-modified, water-redispersible polymer powder compositions and the use of these powders in hydraulically setting systems.

2. Description of the Related Art

Polymers based on vinyl esters, vinyl chloride, (meth) acrylate monomers, styrene, butadiene and ethylene are used first and foremost in the form of their aqueous dispersions or water-redispersible polymer powders in a variety of applications, for example as coating compositions or adhesives, for a wide variety of substrates. Dispersion powders are also used as binders in hydraulically setting coatings or in adhesives such as tile adhesives, in TICS mortars (TICS=thermal insulation composite systems), and in plasters and renders or jointing compositions based on cements or gypsum plaster.

It is known from DE 4402408 A1 that water-redispersible dispersion powder compositions can be hydrophobicized by adding water-dispersible organosilicon compounds in the polymerization and subsequently drying the polymer dispersions obtainable in this way by means of spray drying. In DE 4402409 A1, it is proposed that hydrophobicized redispersion powders be obtained by spraying the corresponding polymer dispersion and water-dispersible silicon compounds together. In DE 10040407 A1, polymer dispersions for tile adhesives are modified with silane-containing compounds and with (thio)urea compounds. For this purpose, silane-functionalized and (thio)urea-functionalized monomers are copolymerized or low molecular weight compounds having appropriate functionalities are used. The use of aqueous dispersions of polymers comprising monomer units derived from vinylsilanes for producing adhesive compositions having improved wet adhesion is known from EP 640630 A1. Aqueous polymer dispersions comprising silane-functionalized polymers for use in tile adhesives are also known from DE-A 2148456 and EP 0035332 A2.

In tile production, there is a trend to denser tiles such as fine stoneware tiles or porcelain-like tiles. The water absorption and porosity of these tiles is greatly reduced; in general, their water absorption is less than 0.2% by weight based on the weight of the tile. As a result, the ability of the inorganic binder in the tile adhesive to form a strong bond with the underside of the tile is greatly reduced. The use of a further organic binder, a dispersion powder or a dispersion is necessary in order to improve the adhesion and flexibility of the tile adhesive. To ensure satisfactory adhesive bonding, it is therefore necessary to use ever higher amounts of polymer for stoneware or fine stoneware coverings.

SUMMARY OF THE INVENTION

It is therefore an object of the invention to develop a dispersion powder which allows good adhesive bonding of tiles, preferably fine stoneware tiles or porcelain-like tiles having a water absorption of less than 0.2% by weight, more preferably fine stoneware tiles having a water absorption of less than 0.05% by weight. These and other objects are achieved through the use of redispersible polymer powders produced by the aqueous emulsion polymerization of conventional vinyl monomer(s) and a silane containing an aminoalkyl or epoxyalkyl group is added, and spray drying the polymer dispersion thus obtained.

DETAILED DESCRIPTION OF THE PREFERRED EMBODIMENTS

The invention thus provides water-redispersible polymer powder compositions obtainable by means of free-radical-initiated polymerization in aqueous medium of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides and subsequent drying of the polymer dispersion obtained, characterized in that one or more silanes of the general formula $$(RO)_{3-n}R^1{}_n SiR^2 X \qquad (1),$$

where
R is a substituted or unsubstituted alkyl, aryl or alkoxyalkyl radical having from 1 to 10 carbon atoms,
$R^1$ is a substituted or unsubstituted hydrocarbon radical having from 1 to 12 carbon atoms,
$R^2$ is a substituted or unsubstituted alkylene radical having from 1 to 20 carbon atoms in which nonadjacent methylene units can be replaced by —O— groups,
X is an amino radical $NHR^3$ or an epoxy radical $CR^4(O)CR^5R^6$, where
$R^3$ is a substituted or unsubstituted alkyl, aryl or aminoalkyl radical having from 1 to 10 carbon atoms and
n is 0, 1, 2 or 3 and
$R^4, R^5, R^6$ are each hydrogen or a substituted or unsubstituted alkyl or aryl radical having from 1 to 10 carbon atoms,
are added before or during the polymerization or before drying of the polymer dispersion.

R is preferably methyl, ethyl or propyl.
In general, the radicals $R^1$ are not substituted. $R^1$ is preferably a hydrocarbon radical having from 1 to 6 carbon atoms, in particular methyl, ethyl, propyl, vinyl or phenyl.
In general, the radicals $R^2$ are not substituted. $R^2$ is preferably an alkylene radical having from 1 to 6 carbon atoms, in particular methylene, ethylene, propylene.
$R^3$ is preferably a hydrocarbon radical having from 1 to 6 carbon atoms, more preferably 2-aminoethyl, phenyl, cyclohexyl, methyl, ethyl, propyl or butyl.
$R^4, R^5$, and $R^6$ are preferably hydrogen.
All the above symbols in the above formulae have their meanings independently of one another. In all formulae, the silicon atom is tetravalent.

The silanes of the formula (1) are used in amounts of from 0.5 to 50% by weight, preferably from 1 to 30% by weight, and more preferably from 2 to 15% by weight, based on the total weight of the water-redispersible polymer powder composition. Preference is given to using aminopropyltrialkoxysilanes of the general formula (1) and glycidoxypropyltrialkoxysilanes of the general formula (1).

Particular preference is given to (3-aminopropyl)triethoxysilane, (3-aminopropyl)trimethoxysilane, N-(2-aminoethyl)(3-aminopropyl)triethoxysilane, N-(2-aminoethyl) (3-aminopropyl)trimethoxysilane, N-(2-aminoethyl) (3-aminopropyl)methyldimethoxysilane, 3-(triethoxysilyl) propylsuccinic anhydride, N-cyclohexylaminomethylmethyldiethoxysilane, N-(3-(triethoxysilyl)propyl)methylurethane, N-(3-(trimethoxysilyl)propyl)methylurethane, N-(3-(triethoxysilyl)propyl)urea, N-(3-(trimethoxysilyl)propyl)urea, (3-glycidoxypropyl)triethoxysilane and (3-glycidoxypropyl)trimethoxysilane.

The silanes of the formula (1) are commercial products or can be prepared by methods customary in silicon chemistry, for example by means of processes as are described in Noll, CHEMIE UND TECHNOLOGIE DER SILIKONE, 2nd Edition 1968, Weinheim, and in Houben-Weyl, METHODEN DER ORGANISCHEN CHEMIE, volume E20, Georg Thieme Verlag, Stuttgart (1987). The silanes of the formula (1) can be used either alone or as mixtures.

Vinyl esters suitable for preparing the base polymer are those of carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 13 carbon atoms, for example VeoVa9$^R$ or VeoVa10$^R$ (trade names of Resolution). Particular preference is given to vinyl acetate.

Suitable methacrylic esters or acrylic esters are esters of unbranched or branched alcohols having from 1 to 15 carbon atoms, e.g. methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Preference is given to methyl acrylate, methyl methacrylate, n-butyl acrylate and 2-ethylhexyl acrylate.

Examples of olefins and dienes are ethylene, propylene and 1,3-butadiene. Suitable vinylaromatics are styrene and vinyltoluene. A suitable vinyl halide is vinyl chloride.

If desired, from 0.05 to 50% by weight, preferably from 1 to 10% by weight, based on the total weight of the base polymer, of auxiliary monomers can additionally be copolymerized. Examples of auxiliary monomers are ethylenically unsaturated monocarboxylic and dicarboxylic acids, preferably acrylic acid, methacrylic acid, fumaric acid and maleic acid; ethylenically unsaturated carboxamides and nitriles, preferably acrylamide and acrylonitrile; monoesters and diesters of fumaric acid and maleic acid, e.g. the diethyl and diisopropyl esters, and also maleic anhydride, ethylenically unsaturated sulphonic acids or their salts, preferably vinylsulphonic acid, and 2-acrylamido-2-methylpropanesulphonic acid. Further examples are precrosslinking comonomers such as multiply ethylenically unsaturated comonomers, for example divinyl adipate, diallyl maleate, allyl methacrylate or triallyl cyanurate, and postcrosslinking comonomers, for example acrylamidoglycolic acid (AGA), methyl methacrylamidoglycolate (MMAG), N-methylolacrylamide (NMA), N-methylolmethacrylamide (NMMA), N-methylolallyl carbamate, alkyl ethers such as the isobutoxy ether, or esters of N-methylolacrylamide, of N-methylolmethacrylamide and of N-methylolallyl carbamate. Epoxide-functional comonomers such as glycidyl methacrylate and glycidyl acrylate are also suitable. Further examples are silicon-functionalized comonomers such as acryloxypropyltri(alkoxy)silanes and methacryloxypropyltri(alkoxy)silanes, vinyltrialkoxysilanes and vinylmethyldialkoxysilanes, with, for example, methoxy, ethoxy and ethoxypropylene glycol ether radicals being able to be present as alkoxy groups. Mention may also be made of monomers having hydroxy or CO groups, for example hydroxyalkyl methacrylates and acrylates, e.g. hydroxyethyl, hydroxypropyl or hydroxybutyl acrylate or methacrylate and also compounds such as diacetoneacrylamide and acetylacetoxyethyl acrylate or methacrylate. Further examples are vinyl ethers such as methyl, ethyl or isobutyl vinyl ether.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers, which may, if desired, additionally contain auxiliary monomers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 12 carbon atoms in the carboxylic acid radical, e.g. vinyl propionate, vinyl laurate, vinyl esters of alpha-branched carboxylic acids having from 9 to 13 carbon atoms, e.g. VeoVa9$^R$, VeoVa10$^R$, VeoVa11$^R$; copolymers of vinyl acetate, from 1 to 40% by weight of ethylene and preferably from 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or vinyl esters of an alpha-branched carboxylic acid having from 9 to 13 carbon atoms and also from 1 to 30% by weight of acrylic esters of unbranched or branched alcohols having from 1 to 15 carbon atoms, in particular n-butyl acrylate or 2-ethylhexyl acrylate, which additionally contain from 1 to 40% by weight of ethylene; copolymers comprising vinyl acetate, from 1 to 40% by weight of ethylene and from 1 to 60% by weight of vinyl chloride; with the polymers additionally being able to contain the amounts mentioned of the auxiliary monomers mentioned and with the figures in % by weight in each case adding up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate and, if desired, ethylene; styrene-acrylic ester copolymers containing one or more monomers from the group consisting of methyl acrylate, ethyl acrylate, propyl acrylate, n-butyl acrylate, 2-ethylhexyl acrylate; vinyl acetate-acrylic ester copolymers containing one or more monomers from the group consisting of methyl acrylate, ethyl acrylate, propyl acrylate, n-butyl acrylate, 2-ethylhexyl acrylate and, if desired, ethylene; styrene-1,3-butadiene copolymers; with the polymers additionally being able to contain the amounts mentioned of the auxiliary monomers mentioned and with the figures in % by weight in each case adding up to 100% by weight.

The choice of monomers and the choice of the proportions by weight of the comonomers is made so that in general a glass transition temperature Tg of from −50° C. to +50° C., preferably from −30° C. to +40° C., results. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956): $1/Tg=x1/Tg1+x2/Tg2+\ldots+xn/Tgn$, where xn is the mass fraction (% by weight/100) of the monomer n and Tgn is the glass transition temperature in Kelvin of the homopolymer of the monomer n. Tg values for homopolymers are given in Polymer Handbook 2nd Edition, J. Wiley & Sons, New York (1975).

The homopolymers and copolymers are prepared by the emulsion polymerization process or by the suspension polymerization process, preferably by the emulsion polymerization process, with the polymerization temperature generally being from 40° C. to 100° C., preferably from 60° C. to 90° C. The copolymerization of gaseous comonomers such as ethylene, 1,3-butadiene or vinyl chloride can also be carried out under superatmospheric pressure, generally in the range from 5 bar to 100 bar.

The polymerization is initiated by means of the water-soluble or monomer-soluble initiators or redox initiator combinations customary in emulsion polymerization or suspension polymerization. Examples of water-soluble initiators are the sodium, potassium and ammonium salts of peroxodisulphuric acid, hydrogen peroxide, t-butyl peroxide, t-butyl hydroperoxide, potassium peroxydiphosphate, tert-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The initiators are generally used in an amount of from 0.001 to 0.02% by weight, preferably from 0.001 to 0.01% by weight, in each case based on the total weight of the monomers.

As redox initiators, use is made of combinations of the abovementioned initiators with reducing agents. Suitable reducing agents are the sulphites and bisulphites of the alkali metals and of ammonium, for example sodium sulphite, the derivatives of sulphoxylic acid, e.g. zinc or alkali metal formaldehydesulphoxylates, for example sodium hydroxymethanesulphinate, and ascorbic acid. The amount of reducing agent is generally from 0.001 to 0.03% by weight, preferably from 0.001 to 0.015% by weight, in each case based on the total weight of the monomers.

To control the molecular weight, regulating substances can be used during the polymerization. If regulators are used, they are usually used in amounts of from 0.01 to 5.0% by weight, based on the monomers to be polymerized, and are introduced separately or premixed with reaction components. Examples of such substances are n-dodecyl mercaptan, tert-dodecyl mercaptan, mercaptopropionic acid, methyl mercaptopropionate, isopropanol and acetaldehyde.

Suitable protective colloids for the polymerization are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl, hydroxypropyl derivatives, dextrins and cyclodextrins; proteins such as casein or caseinate, soya protein, gelatin; lignosulphonates; synthetic polymers such as poly(meth)acrylic acid, copolymers of (meth)acrylates with carboxyl-functional comonomer units, poly(meth)acrylamide, polyvinylsulphonic acids and their water-soluble copolymers; melamine-formaldehyde sulphonates, naphthalene-formaldehyde sulphonates, styrene-maleic acid and vinyl ether-maleic acid copolymers.

Preference is given to partially hydrolysed or fully hydrolysed polyvinyl alcohols having a degree of hydrolysis of from 80 to 100 mol %, in particular partially hydrolysed polyvinyl alcohols having a degree of hydrolysis of from 80 to 95 mol % and a Höppler viscosity in 4% strength aqueous solution of from 1 to 30 mPas (Höppler method at 20° C., DIN 53015). Preference is also given to partially hydrolysed, hydrophobically modified polyvinyl alcohols having a degree of hydrolysis of from 80 to 95 mol % and a Höppler viscosity in 4% strength aqueous solution of from 1 to 30 mPas. Examples are partially hydrolysed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, olefins such as ethene and decene. The proportion of the hydrophobic units is preferably from 0.1 to 10% by weight, based on the total weight of the partially hydrolysed polyvinyl alcohol. It is also possible to use mixtures of the polyvinyl alcohols mentioned.

Polyvinyl alcohols having a degree of hydrolysis of from 85 to 94 mol % and a Höppler viscosity in 4% strength aqueous solution of from 3 to 15 mPas (Höppler method at 20° C., DIN 53015) are most preferred. The protective colloids mentioned can be obtained by methods known to those skilled in the art and are generally added in a total amount of from 1 to 20% by weight, based on the total weight of the monomers, in the polymerization.

If the polymerization is carried out in the presence of emulsifiers, they are used in an amount of from 1 to 5% by weight based on the amount of monomers. Suitable emulsifiers are anionic, cationic and nonionic emulsifiers, for example anionic surfactants such as alkylsulphates having a chain length of from 8 to 18 carbon atoms, alkyl or alkylaryl ether sulphates having from 8 to 18 carbon atoms in the hydrophobic radical and up to 40 ethylene oxide or propylene oxide units, alkylsulphonates or alkylarylsulphonates having from 8 to 18 carbon atoms, esters and monoesters of sulphosuccinic acid with monohydric alcohols or alkylphenols, or nonionic surfactants such as alkyl polyglycol ethers or alkylaryl polyglycol ethers having from 8 to 40 ethylene oxide units.

The silanes of the formula (1) can be initially charged prior to the polymerization or can be added during the polymerization. In general, they are added in pure form or in the form of an aqueous solution or as an aqueous dispersion.

After conclusion of the polymerization, an after-polymerization can be carried out to remove residual monomers using known methods, in general by means of an after-polymerization initiated by a redox catalyst. Volatile residual monomers can also be removed by means of distillation, preferably under reduced pressure, and, if appropriate, with inert entrainer gases such as air, nitrogen or steam being passed through or over the polymerization mixture. The aqueous polymer dispersions obtainable in this way have a solids content of from 30 to 75% by weight, preferably from 50 to 60% by weight.

The silanes of the formula (1) are, after conclusion of the polymerization, preferably mixed into the polymer dispersion in pure form or in the form of an aqueous solution or as an aqueous dispersion.

To produce the water-redispersible polymer powders, the aqueous dispersions, if appropriate after addition of protective colloids as atomization aid, are dried, for example by means of fluidized-bed drying, freeze drying or spray drying. The dispersions are preferably spray dried. Spray drying is carried out in customary spray drying plants, with atomization being able to be carried out by means of single-fluid, two-fluid or multifluid nozzles or by means of a rotary disc. The outlet temperature is generally in the range from 45° C. to 120° C., preferably from 60° C. to 90° C., depending on the plant, the Tg of the resin and the desired degree of drying.

In general, the drying aid (protective colloid) is used in a total amount of from 3 to 30% by weight, based on the polymeric constituents of the dispersion. Preference is given to using from 5 to 20% by weight, based on the polymer.

Suitable drying aids are partially hydrolysed polyvinyl alcohols; polyvinylpyrrolidones; polysaccharides in water-soluble form, e.g. starches (amylose and amylopectin), celluloses and their carboxymethyl, methyl, hydroxyethyl, hydroxypropyl derivatives; proteins such as casein or caseinate, soya protein, gelatin; lignosulphonates; synthetic polymers such as poly(meth)acrylic acid, copolymers of (meth) acrylates with carboxyl-functional comonomer units, poly (meth)acrylamide, polyvinylsulphonic acids and their water-soluble copolymers; melamine-formaldehyde sulphonates, naphthalene-formaldehyde sulphonates, styrene-maleic acid and vinyl ether-maleic acid copolymers. Preference is given to using no further protective colloids other than polyvinyl alcohols as drying aids, with the polyvinyl alcohols preferred as protective colloids preferably also being used as drying aids.

A content of up to 1.5% by weight of antifoam, based on the base polymer, has frequently been found to be advantageous during drying. To increase the storage stability by improving the blocking stability, in particular in the case of powders having a low glass transition temperature, the powder obtained can be provided with an antiblocking agent (anticaking agent), preferably in an amount of up to 30% by weight, based on the total weight of polymeric constituents. Examples of antiblocking agents are Ca or Mg carbonate, talc, gypsum, silica, kaolins, metakaolin, calcined kaolin, silicates having particle sizes of preferably from 10 nm to 100 μm.

The viscosity of the feed to be dried is set via the solids content so that a value of <1500 mPas (Brookfield viscosity at 20 revolutions and 23° C.), preferably <500 mPas, is obtained. The solids content of the mixture to be dried is >35%, preferably >40%.

To improve the use properties, further additives can be added during drying. Further constituents present in preferred embodiments of dispersion powder compositions are, for example, pigments, fillers, foam stabilizers, and hydrophobicizing agents.

The water-redispersible polymer powder compositions can be used in applications typical for them. They can be used either alone or in combination with conventional polymer dispersions or dispersion powders, for example in building chemical products, if appropriate in combination with hydraulically setting binders such as cements (portland cement, alumina cement, pozzolanic cement, slag cement, magnesia cement, phosphate cement), gypsum plaster and water glass, for the production of building adhesives, in particular tile adhesives and thermal insulation adhesives, plasters and renders, knifing fillers, flooring compositions, self-levelling screeds, sealing slurries, jointing mortars and paints. Further applications are gunned mortar and gunned concrete for building and construction and for lining tunnel walls.

Preferred fields of application are tile adhesives for tiles, more preferably for tiles having low water absorption, most preferably for tiles having a water absorption of less than 0.2% by weight, in particular less than 0.05% by weight.

The procedure according to the invention surprisingly gives dispersion powders which significantly improve the adhesion of tiles, in particular fine stoneware tiles, without higher amounts of dispersion powders having to be used.

EXAMPLES

Powders

The powders were produced by spray drying a dispersion of an ethylene-vinyl acetate copolymer stabilized with polyvinyl alcohol with addition of 6% by weight of a polyvinyl alcohol having a degree of hydrolysis of 88 mol % and a Höppler viscosity of 4 mPas and with addition of the silane derivative.

The mixture was then sprayed by means of a two-fluid nozzle. Air precompressed to 4 bar served as the atomization component, and the droplets formed were dried in a cocurrent manner by means of air heated to 125° C. The dry powder obtained was admixed with 15% by weight of commercial antiblocking agent.

Powder P1: Containing 8% by weight of (3-aminopropyl)triethoxysilane
Powder P2: Containing 8% by weight of N-(2-aminoethyl)(3-aminopropyl)trimethoxysilane
Powder P3: Containing 8% by weight of (3-glycidoxypropyl)trimethoxysilane
Comparative powder CP4: Without silane addition
Comparative powder CP5: Containing 8% by weight of isooctyltriethoxysilane Testing:

The powder properties of the powders obtained and their processing and adhesion in a cement-containing tile adhesive were examined.

Determination of the Blocking Resistance BR:

To determine the blocking resistance, the dispersion powder was introduced into an iron tube having a screw cap and was then loaded by means of a metal punch. The tube was stored under load at 50° C. for 16 hours in a drying oven. After cooling to room temperature, the powder was removed from the tube and the blocking stability was determined qualitatively by crushing the powder. The blocking stability was classified as follows:
1=very good blocking stability
2=good blocking stability
3=satisfactory blocking stability
4=not stable to blocking; powders no longer free-flowing after crushing.

Determination of the Sedimentation Behaviour RA:

The sedimentation behaviour of the redispersion serves as a measure of the redispersibility of the powder. The redispersions were produced in a strength of 50% in water by application of strong shear forces.

The sedimentation behaviour was then determined on diluted redispersions (solids content: 0.5%), and for this purpose 100 ml of this dispersion were placed in a graduated tube and the height of sedimented solid was measured. The result is reported in mm of sediment after 24 hours. Values of greater than 7 indicate unsatisfactory redispersion of the powder.

Determination of the Adhesive Pull Strengths APS of a Cement-Containing Tile Adhesive Modified with the Dispersion Powders:

The adhesive pull strengths and processing were tested in the following formulation (6% by weight of polymer powder):

| | |
|---|---|
| Silica sand | 514 parts by weight |
| Cement (portland/alumina cement mixture) | 420 parts by weight |
| Cellulose ether | 4 parts by weight |
| Retarder/accelerator | 2 parts by weight |
| Dispersion powder | 60 parts by weight |

The dry mortar was mixed with from 22 to 24 parts by weight of water per 100 parts by weight of dry mix.

Comparative Example TA1

Powder CP4 and Silane

The above formulation was made up, but 56 parts by weight of the powder CP4 were used in place of 60 parts by weight of dispersion powder and 4 parts by weight of N-(2-aminoethyl)(3-aminopropyl)trimethoxysilane were added to the make-up water.

Comparative Example TA2

Only Silane

The above formulation was made up, but no dispersion powder was used. 4 parts by weight of N-(2-aminoethyl)(3-amino-propyl)trimethoxysilane were added to the make-up water.

The adhesive pull strengths for fine stoneware tiles in N/mm² (tile 1: water absorption <0.2% by weight; tile 2: water absorption <0.05% by weight) were determined after storage under the following storage conditions:

| 7 d SA/21 d H₂O: | 7 days standard atmosphere/21 days wet storage; |
| 14 d SA/14 d 70° C./1 d SA: | 14 days standard atmosphere/14 days 70° C./1 day standard atmosphere |

The results of the testing of the blocking resistance BR, the sedimentation behaviour RA of the dispersion powders and the results of the adhesive pull strengths and processing of the tile adhesives are summarized in Table 1.

It can be seen from the data that the powder properties are not adversely affected in the case of the products according to the invention, but the use properties are significantly improved. Particularly in the adhesive bonding of fine stoneware tiles having a water absorption of <0.05% by weight (tile 2), the adhesion when using the powders modified according to the invention (P1 to P3) is significantly better than when using formulations which contain conventional redispersion powders (CP4).

The adhesion values obtained using the powders modified according to the invention are not achieved even with subsequent addition of silane of the formula (1) to the dry mortar (TA1).

TABLE 1

| Ex | BR | RA | 7 d SA/21 d H₂O | | 14 d SA/14 d 70° C./1 d SA | | Processing |
|---|---|---|---|---|---|---|---|
| | | | Tile 1 | Tile 2 | Tile 1 | Tile 2 | |
| P1 | 1 | 3.3 | 0.93 | 0.92 | 1.46 | 0.71 | easy |
| P2 | 1 | 4.0 | 1.25 | 0.81 | 1.58 | 0.62 | easy, fluidizes readily |
| P3 | 2 | 5.5 | 1.06 | 0.95 | 1.64 | 0.76 | easy |
| CP4 | 1 | 2.8 | 0.82 | 0.38 | 1.82 | 0.44 | easy, slight after-thickening |
| CP5 | 3 | 5.2 | 0.72 | 0.43 | 1.59 | 0.45 | difficult, hard to wet |
| TA1 | — | — | 0.90 | 0.70 | 1.40 | 0.51 | easy |
| TA2 | — | — | 0.42 | 0.17 | 0.23 | 0.0 | relatively easy |

The invention claimed is:

1. A spray-dried water-redispersible polymer powder composition comprising
    as a first component, a polymer of at least one monomer selected from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides and,
    as a second component one or more silanes of the general formula $$(RO)_{3-n}R^1_nSiR^2X \qquad (1),$$

where
R is a substituted or unsubstituted alkyl, aryl or alkoxyalkyl radical having from 1 to 10 carbon atoms,
$R^1$ is a substituted or unsubstituted hydrocarbon radical having from 1 to 12 carbon atoms,
$R^2$ is a substituted or unsubstituted alkylene radical having from 1 to 20 carbon atoms in which nonadjacent methylene units can be replaced by —O— groups,
X is an amino radical $NHR^3$ or an epoxy radical $CR^4(O)CR^5R^6$, where
$R^3$ is hydrogen or a substituted or unsubstituted alkyl, aryl or aminoalkyl radical having from 1 to 10 carbon atoms and
n is 0, 1, 2 or 3 and
$R^4$, $R^5$, $R^6$ are each hydrogen or a substituted or unsubstituted alkyl or aryl radical having from 1 to 10 carbon atoms,
wherein
after polymerization an aqueous dispersion of the polymer is obtained,
wherein the silane (1) is added to the aqueous dispersion of the polymer after conclusion of polymerization and before spray drying, to form an aqueous mixture and the aqueous mixture is then spray dried to form the water-redispersible polymer powder.

2. The spray-dried water-redispersible polymer powder composition of claim 1, wherein the silanes of the formula (1) are used in amounts of from 0.5 to 50% by weight, based on the total weight of the spray-dried water-redispersible polymer powder composition.

3. The spray-dried water-redispersible polymer powder composition of claim 1, wherein the silanes of the formula (1) consist of aminopropyltrialkoxysilanes of the formula (1).

4. The spray-dried water-redispersible polymer powder composition of claim 1, wherein one or more silanes of the formula (1) selected from the group consisting of (3-aminopropyl)triethoxysilane, (3-aminopropyl)trimethoxysilane, N-(2-aminoethyl)(3-aminopropyl)triethoxysilane, N-(2-aminoethyl)(3-aminopropyl)trimethoxy-silane, N-(2-aminoethyl)(3-aminopropyl)methyldimethoxysilane, 3-(triethoxysilyl)-propylsuccinic anhydride, N-cyclohexylaminomethylmethyldiethoxysilane, N-(3-(triethoxysilyl)propyl)methyl-urethane, N-(3-(trimethoxysilyl)propyl)methylurethane, N-(3-(triethoxysilyl)propyl)urea, N-(3-(trimethoxysilyl)propyl)urea, (3-glycidoxypropyl)triethoxysilane and (3-glycidoxypropyl)tri-methoxysilane are used.

5. A process for producing a spray-dried water-redispersible polymer powder compositions of claim 1, comprising free-radical-initiated polymerizing of one or more addition-polymerizable monomers, in aqueous medium, the one or more addition-polymerizable monomers selected from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides, and subsequently drying a polymer dispersion thereby obtained, wherein one or more silanes of the formula $$(RO)_{3-n}R^1_nSiR^2X \qquad (1),$$

where
R is a substituted or unsubstituted alkyl, aryl or alkoxyalkyl radical having from 1 to 10 carbon atoms,
$R^1$ is a substituted or unsubstituted hydrocarbon radical having from 1 to 12 carbon atoms,
$R^2$ is a substituted or unsubstituted alkylene radical having from 1 to 20 carbon atoms in which nonadjacent methylene units can be replaced by —O— groups,
X is an amino radical $NHR^3$ or an epoxy radical $CR^4(O)CR^5R^6$, where
$R^3$ is hydrogen or a substituted or unsubstituted alkyl, aryl or aminoalkyl radical having from 1 to 10 carbon atoms and
n is 0, 1, 2 or 3 and
$R^4$, $R^5$, $R^6$ are each hydrogen or a substituted or unsubstituted alkyl or aryl radical having from 1 to 10 carbon atoms,
are added after conclusion of the polymerizing and before the spray drying of the polymer dispersion, and spray drying the polymer dispersion to form said spray-dried water-redispersible polymer powder composition.

6. The process of claim 5, wherein the silanes of the formula (1) are, after conclusion of the polymerizing, mixed into the polymer dispersion in neat form, in the form of an aqueous solution, as an aqueous dispersion, or a combination thereof.

7. In a building chemical product comprising at least one hydraulically setting binder and a redispersible powder, the improvement comprising substituting for at least a portion of the redispersible polymer powder, at least one spray-dried water-redispersible polymer powder of claim 1.

8. The building chemical product of claim 7, comprising a building adhesive, tile adhesive, thermal insulation adhesive, plaster or render, scimcoat, knifing filler, flooring composition, self-leveling screed, sealing slurry, jointing mortar, paint, gunned mortar or gunned concrete.

9. A process for adhering low water absorption tiles having a water absorption of less than 0.2% by weight to a substrate by means of a tile adhesive, comprising adding at least one spray-dried water-redispersible polymer powder of claim 1 to a tile adhesive containing a hydraulically setting binder(s), and adhering the tiles to the substrate employing the tile adhesive.

10. A process for adhering low water absorption tiles having a water absorption of less than 0.05% by weight to a substrate by means of a tile adhesive, comprising adding at least one spray-dried water-redispersible polymer powder of claim 1 to a tile adhesive containing a hydraulically setting binder(s), and adhering the tiles to the substrate employing the tile adhesive.

11. The spray-dried water-redispersible polymer powder composition of claim 1, wherein a silane (1) where X is an epoxy radical $CR^4(O)CR^5R^6$ is present.

12. The spray-dried water-redispersible polymer powder composition of claim 1, wherein a silane (1) where X is $NHR^3$ and a silane (1) where X is $CR^4(O)CR^5R^6$ are both present.

13. The process of claim 5, wherein a silane (1) where X is an epoxy radical $CR^4(O)CR^5R^6$ is added after polymerizing and before drying the polymer dispersion.

14. In a building chemical product comprising at least one hydraulically setting binder and a redispersible powder, the improvement comprising substituting for at least a portion of the redispersible polymer powder, at least one spray-dried water-redispersible polymer powder of claim 11.

15. A process for adhering low water absorption tiles having a water absorption of less than 0.2% by weight to a substrate by means of a tile adhesive, comprising adding at least one spray-dried water-redispersible polymer powder of claim 11 to a tile adhesive containing a hydraulically setting binder(s), and adhering the tiles to the substrate employing the tile adhesive.

16. A process for adhering low water absorption tiles having a water absorption of less than 0.05% by weight to a substrate by means of a tile adhesive, comprising adding at least one water-redispersible polymer powder of claim 11 to a tile adhesive containing a hydraulically setting binder(s), and adhering the tiles to the substrate employing the tile adhesive.

17. The spray-dried water-redispersible polymer powder composition of claim 1, wherein said one or more silanes of the formula (1) are selected from the group consisting of silanes of the formula (1) where X is $NHR^3$.

18. The spray-dried water-redispersible polymer powder composition of claim 1, wherein said one or more silanes of the formula (1) are selected from the group consisting of silanes of the formula (1) where X is $CR^4(O)CR^5R^6$.

19. The spray-dried water-redispersible polymer powder composition of claim 1, wherein said one or more silanes of the formula (1) are selected from the group consisting of (3-aminopropyl)triethoxysilane, (3-aminopropyl)trimethoxysilane, N-(2-aminoethyl)(3-aminopropyl)triethoxysilane, N-(2-aminoethyl)(3-aminopropyl)trimethoxysilane, N-(2-aminoethyl)(3-aminopropyl)methyl-dimethoxysilane, 3-(triethoxysilyl)propylsuccinic anhydride, N-cyclohexylaminomethyl-methyldiethoxysilane, N-(3-(triethoxysilyl)propyl)methylurethane, N-(3-(trimethoxysilyl)-propyl)methylurethane, N-(3-(triethoxysilyl)propyl)urea, and N-(3-(trimethoxysilyl)propyl)urea.

20. A process for producing water-redispersible polymer powder compositions comprising free-radical-initiated polymerizing one or more addition-polymerizable monomers, in aqueous medium, the one or more monomers selected from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides, and optionally one or more auxiliary comonomers selected from the group consisting of ethylenically unsaturated carboxamides and nitriles, diesters of fumaric acid and maleic acid, divinyl adipate, diallyl maleate, allyl methacrylate, triallyl cyanurate, methyl methacrylamidoglycolate (MMAG), N-methylolacrylamide (NMA), N-methylolmethacrylamide (NMMA), N-methylolallyl carbamate, alkyl ethers of N-methylolacrylamide, of N-methylolmethacrylamide and of N-methylolallyl carbamate, acryloxypropyltri(alkoxy)silanes, methacryloxypropyltri(alkoxy)silanes, vinyltrialkoxy-silanes, vinylmethyldialkoxysilanes, hydroxyalkyl (meth)acrylates, diacetoneacrylamide and acetylacetoxyethyl (meth)acrylate, and vinyl ethers, and subsequently drying a polymer dispersion thereby obtained, wherein one or more silanes of the formula $$(RO)_{3-n}R^1{}_n SiR^2 X \qquad (1),$$

Where
R is a substituted or unsubstituted alkyl, aryl or alkoxyalkyl radical having from 1 to 10 carbon atoms,
$R^1$ is a substituted or unsubstituted hydrocarbon radical having from 1 to 12 carbon atoms,
$R^2$ is a substituted or unsubstituted alkylene radical having from 1 to 20 carbon atoms in which nonadjacent methylene units can be replaced by —O— groups,
X is an amino radical $NHR^3$ or an epoxy radical $CR^4(O)CR^5R^6$, where $R^3$ is a hydrogen or substituted or unsubstituted alkyl, aryl or aminoalkyl radical having from 1 to 10 carbon atoms and n is 0, 1, 2 or 3 and $R^4$, $R^5$, $R^6$ are each hydrogen or a substituted or unsubstituted alkyl or aryl radical having from 1 to 10 carbon atoms, are added after conclusion of the polymerizing and before spray drying the polymer dispersion, to form an aqueous mixture and spray drying the aqueous mixture to form the spray-dried water-redispersible polymer powder composition.

21. The water-redispersible polymer powder composition of claim 1, wherein spray drying is performed with the addition of a protective colloid.

22. The spray-dried water-redispersible polymer powder composition of claim 1, wherein the first component is selected from the group consisting of copolymers of vinyl acetate and ethylene, and terpolymers of vinyl acetate, ethylene, and vinyl ester other than vinyl acetate.

* * * * *